Dec. 16, 1941.  H. A. ROBSON  2,266,078
MACHINE FOR GATHERING AND FEEDING MOLTEN GLASS
Filed Jan. 26, 1937  9 Sheets-Sheet 1

Inventor
Horace A. Robson,
By Cushman Darby & Cushman
Attorneys

Dec. 16, 1941.   H. A. ROBSON   2,266,078
MACHINE FOR GATHERING AND FEEDING MOLTEN GLASS
Filed Jan. 26, 1937   9 Sheets-Sheet 3

Inventor
Horace Alexander Robson,
John J. V. Armstrong
Attorneys

Dec. 16, 1941.  H. A. ROBSON  2,266,078
MACHINE FOR GATHERING AND FEEDING MOLTEN GLASS
Filed Jan. 26, 1937  9 Sheets-Sheet 4

Inventor
Horace Alexander Robson
John J. V. Armstrong
Attorney

Dec. 16, 1941.  H. A. ROBSON  2,266,078
MACHINE FOR GATHERING AND FEEDING MOLTEN GLASS
Filed Jan. 26, 1937  9 Sheets-Sheet 5

Inventor.
Horace Alexander Robson,
John J. V. Armstrong
Attorneys

Dec. 16, 1941.       H. A. ROBSON       2,266,078
MACHINE FOR GATHERING AND FEEDING MOLTEN GLASS
Filed Jan. 26, 1937       9 Sheets-Sheet 7

Inventor
Horace Alexander Robson
John J. V. Armstrong
Attorneys

Patented Dec. 16, 1941

2,266,078

UNITED STATES PATENT OFFICE 2,266,078

MACHINE FOR GATHERING AND FEEDING MOLTEN GLASS

Horace Alexander Robson, New Earswick, near York, England, assignor to Crown Cork & Seal Company, Inc., New York, N. Y., a corporation of New York Application January 26, 1937, Serial No. 122,453
In Great Britain February 7, 1936

14 Claims. (Cl. 49—62)

The present invention relates to the feeding of a charge of molten glass to parison moulds or the like receptacles wherein a suction operated gathering head or mould is lowered to the surface of glass in a furnace or tank and then a charge is sucked up into the mould of the gathering head which is displaced from the furnace or tank to drop the charge therein into an inverted parison mould or receptacle for further operations on the glass charge, such as the blowing, pressing or pressing and blowing of a bottle or other hollow glass article.

It will be appreciated that, in feeders of the suction gathering type referred to above, the sheared end of the charge ultimately becomes the neck end of the bottle or other hollow article of glassware when this is formed should the charge be dropped directly into the inverted parison mould or other receptacle after displacement of the gathering mould from a position above the fore hearth of the furnace to a position above the said parison mould. In consequence it will be seen that in the event of the shears losing their sharpness, or otherwise making an objectionable scar on the charge, the bottle or other hollow article of glassware is ultimately produced with a defective neck.

The object of the present invention is to overcome this disadvantage and accordingly a suction gathering mould, in its displacement from above the fore hearth to an inverted parison mould for the purpose of dropping a charge of molten glass picked up from the fore hearth, is inverted so that the sheared end of the charge, when the same enters the inverted parison mould, lies at the upper, base end of the mould and constitutes the base of the hollow article of glassware ultimately produced.

The means for turning the gathering mould through 180° during displacement of the mould from a position above the fore hearth to a position above the inverted parison mould is preferably associated with the means for effecting such displacement.

The invention is more particularly described with reference to the accompanying drawings, in which.

A forehearth I' projects from a glass melting tank 2 is provided with a laterally extending supporting bracket 3 having a bearing 4 adjacent its outer end. A stationary column 5 is secured to the bracket by any appropriate means, and may be provided with a bearing constituting a continuation of the bearing 4. A vertically disposed shaft or spindle 6 is journalled in these bearings. At its upper end, the shaft carries a head 7 from which a swinging arm 28, hereinafter described, projects toward the forehearth. On its lower end, the shaft or spindle 6 carries a pinion 8, in mesh with a rack 9 fixed to the piston rod 10 of a piston (not shown) mounted for reciprocation in a cylinder 11. Thus, when air under pressure is admitted to the opposite ends of the cylinder 11, in a well known manner, the rack is reciprocated, the spindle 6 is oscillated and the arm 28 is swung horizontally, as hereinafter described.

The column 5 may be provided with a pair of angularly projecting brackets 50, 50', which support, at their outer ends, a rack 49 described below. Upstanding posts 15, 16, mounted on the brackets 50, 50' carry a cam track 53, above the swinging arm 28. The column 5 has a second laterally projecting bracket 17 which supports a second cam track 44, the function of which is described below.

In the construction according to Figures 1–7 of the drawings, the mould is divided into upper and lower parts, each of which is formed of two halves that is to say the mould consists of lower halves 20, 21, and upper halves 22, 23, which are carried by arms, 20a, 21a, 22a, 23a respectively all of which are adapted to swing about a common pivot 24. When the mould is closed a chamber formed by the upper and lower pairs of halves 22, 23 and 20, 21, respectively is adapted to communicate with a suction head 25 pivoted at 26 to a bracket 27 of a swinging arm 28 but in communication with a conduit 29 through which suction is adapted to be applied to the suction head 25.

The arms 22a, 23a of the upper halves 22, 23 of the mould in addition to pivoting about a common pivot 24 are respectively pivotally connected (Fig. 4) to links 30, 31 at 32, 33, whilst the arms 20a, 21a of the lower halves 20, 21 are pivoted to links 34, 35 at 36, 37, respectively. The links 30, 31, 34, 35 have a common pivot 38 on a yoke 39 of a rod 40 which passes through a bearing 41 of a slide 42 adapted for reciprocation longitudinally of the swinging arm 28 under the action of a roller 43 in a fixed cam track 44, the roller 43 being supported by the slide 42 and depending therefrom.

The rod 40 also passes through a bearing 45 of a drum 46 adapted for rotation within a housing 47 carried by the swinging arm 28, the bearing 45 of the drum carrying a pinion 48 adapted to engage with a rack 49 on a stationary bracket 50.

From this it follows that as the arm 28 swings about the vertical axis of the spindle 6, the pinion 48 in travelling along the stationary rack 49 is rotated through 180° to invert the mould, the pivot 24 of which is carried by the drum, whilst on angular displacement in the reverse direction of the swinging arm 28 the pinion is rotated in the reverse direction through 180° to cause the mould to assume its original upright position.

The arm 28 may swing to and fro to any extent about its vertical axis, but preferably the arc of swing is one subtending an angle of substantially 60°.

Again, by virtue of the variation in the radius of the cam track 44 about the axis of swing of the arm 28 any swing of such arm in addition causes displacement of the slide member 42 longitudinally of the arm with the result that the rod 40 is longitudinally displaced when the roller 43 reaches a variable part of the path of the cam track 44. This longitudinal displacement of the rod 40 in turn causes angular displacement of the links 30, 31, 34, 35, to open the upper and lower mould halves about their common pivot 24, and as the pivots 36, 37, are disposed at a greater distance than the pivots 32, 33, from the common pivot 24, the lower mould halves 20, 21, are opened by a smaller amount than the upper halves 22, 23.

The suction head 25 is in the form of a lever of the first order, the end 51 carrying a roller 52 which is adapted to engage a stationary cam track 53 of variable height in comparison with the operating gear so that when the swinging arm 28 is angularly displaced about its vertical axis the suction head pivots about the horizontal axis 26 and is brought into and out of engagement with the top of the mould.

Figure 1:
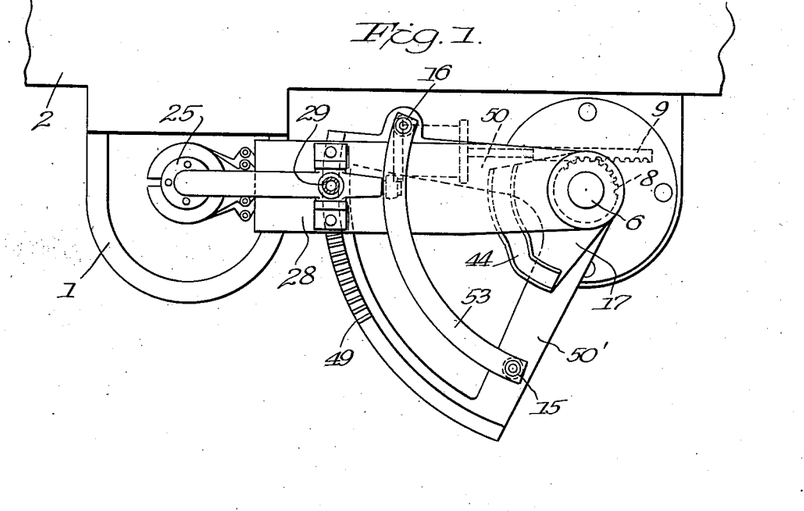
Figure 1 is a plan view of a gathering apparatus in accordance with the present invention.
Figure 2:
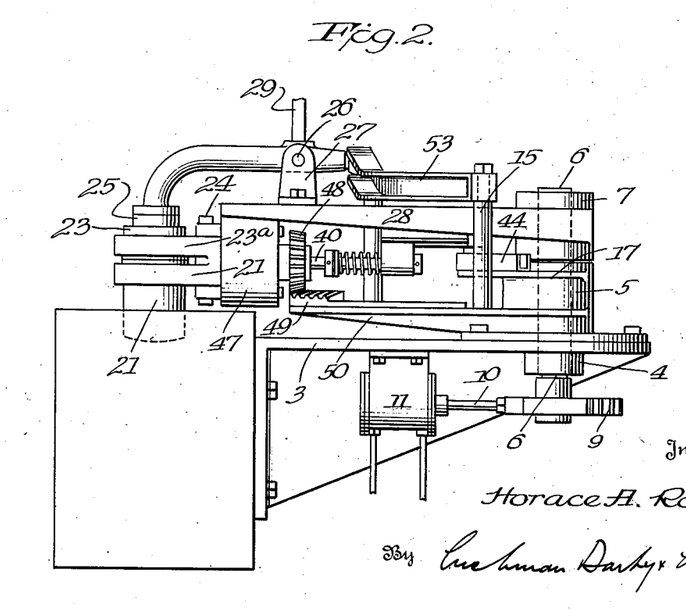
Figure 2 is a front elevation of the apparatus of Figure 1.
Figure 3:
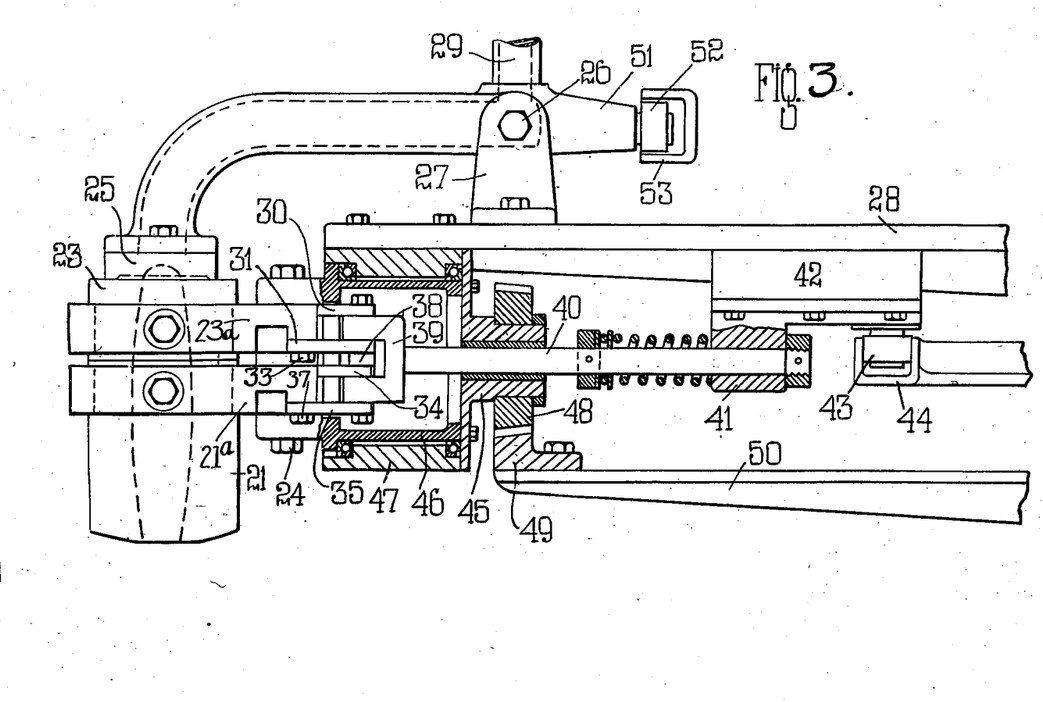
Figure 3 is a side elevational view partly in section, similar to Figure 2, but on a larger scale, showing one form of mould in a position in which it is ready to suck up a charge of molten glass, a swinging arm for the mould, a suction head therefor, and in section a turn-over drum, rack, pinion and mould opening gear.
Figure 4:
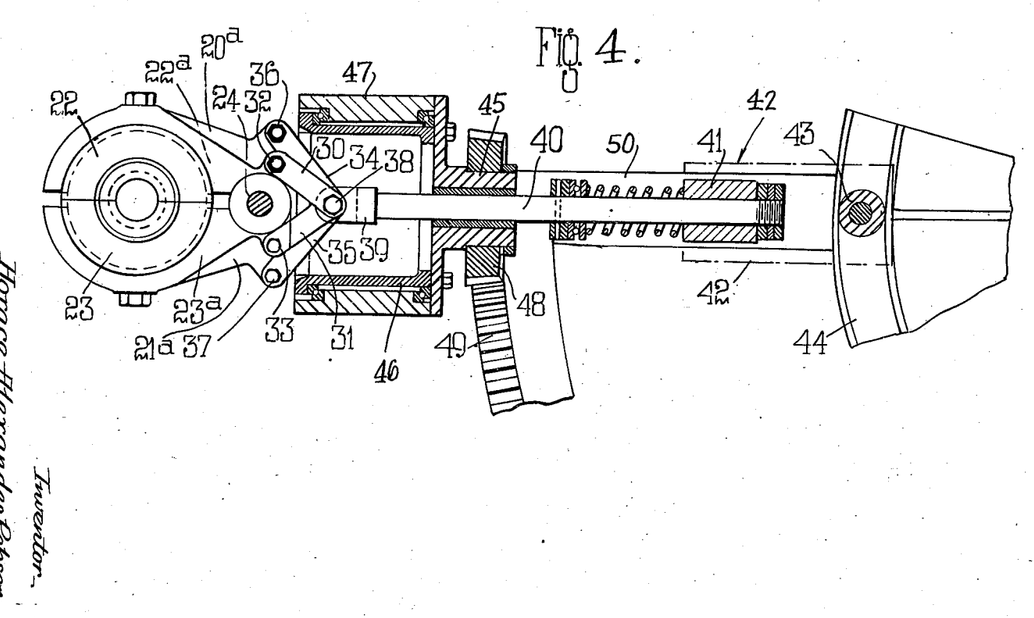
Figure 4 is a corresponding sectional plan view with the swinging arm and the suction head removed.
Figure 5:
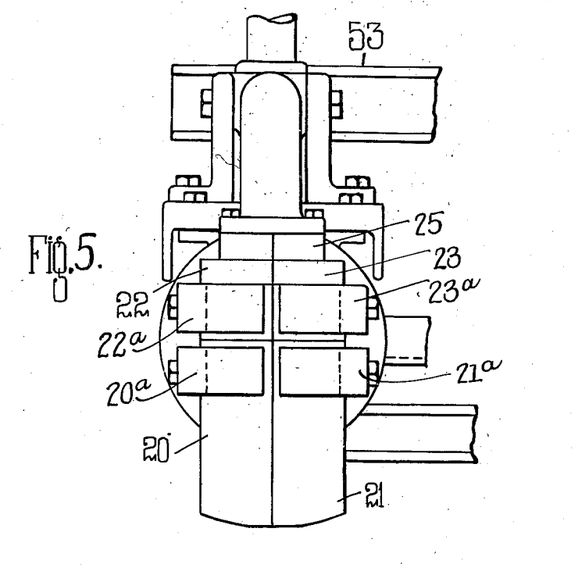
Figure 5 is a front elevational view showing the mould closed and the suction head in a position consistent with suction of the charge.
Figure 6:
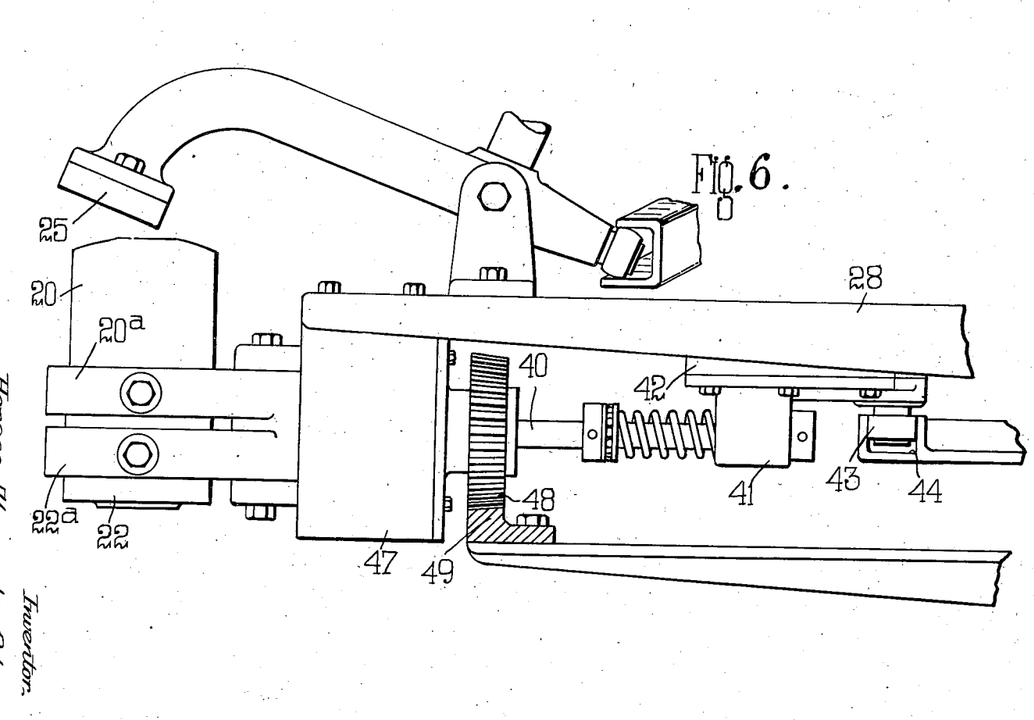
Figure 6 is a side elevational view with the suction head displaced from the mould and with the latter open and inverted when delivering a charge to a parison mould (not shown) beneath it.
Figure 7:
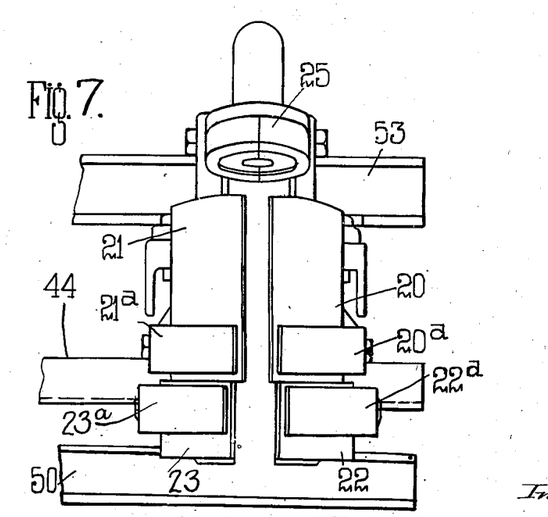
Figure 7 is a corresponding front elevational view showing the mould inverted and with what originally were the two upper halves, but with the mould inverted are lowermost, opened to a greater extent than the two lower halves which on inversion of the mould lie uppermost, the mould in this position being capable of delivering a charge to a parison mould (not shown) beneath it.

In operation and with the elements in the position shown in Figures 1, 2 and 3 suction is applied through the conduit 29 and the suction head 25 to the mould whereby a charge is drawn into the mould. The arm 28 is then swung about the vertical axis of the spindle 6 and the suction head 25 is swung upwardly out of contact with the mould. The drum 46 then commences to revolve by virtue of the rotation of the pinion 48 in engagement with the rack 49 and the mould is brought to an inverted position whereupon the roller 43 enters a variable part of the cam track 44 to displace the rod 40 longitudinally of its axis and thus cause the mould portions to be opened to the extent shown in Figure 7, in which position the mould is enabled to drop its charge to a parison mould (not shown) beneath it.

By virtue of the fact that the mould halves 20, 21, are opened by a smaller extent than the mould halves 22, 23, the former function as guides having a steadying effect on the charge during opening of the mould parts to enable this to descend with certainty into the parison mould located below the mould.

Figures 8, 9:
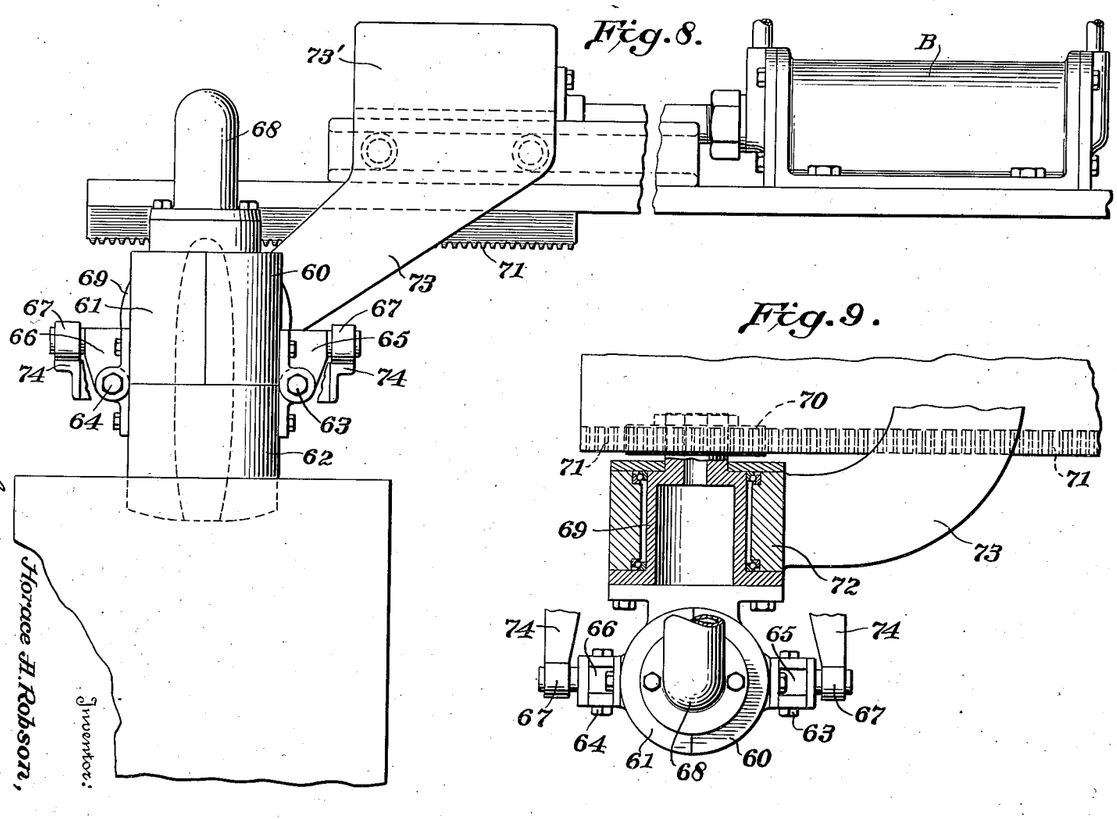
Figure 8 is a front elevational view of a modified form of mould shown with the mould portions closed and with the suction head in that position consistent with picking up of a charge of glass.
Figure 9 is a corresponding sectional plan view.

In the modified form of construction illustrated in Figures 8–14 the mould instead of being formed of upper and lower halves which are pivoted about an axis extending parallel with the longitudinal axis of the mould chamber, is formed of three parts which when the mould is in its normal position consist of a pair of upper halves 60, 61, and a lower portion 62 which maintains its annular formation throughout. The upper halves 60, 61 are pivoted at 63, 64, respectively to the lower annular part 62 and carry brackets 65, 66, respectively, each of which is provided with a roller 67. In this construction the suction head 68 during suction of the charge into the mould is adapted to engage with the top of the upper halves 60, 61 and is swung upwardly out of engagement with said halves by means similar to that shown in Figures 1–7. Again, a drum 69 carrying the mould parts is adapted for rotation about its own axis to invert the mould, and for this purpose, the drum carries a pinion 70 adapted to engage with a stationary rack 71. The drum is rotatable within a housing 72 carried by an arm 73 which is displaceable linearly from a gathering position associated with a forehearth toward the right to a discharge position, along a linear path. Although any appropriate means may be used for supporting the arm 73 and for reciprocating the same along the linear path, as shown in Figure 8, the arm is carried by a slidable carriage 73' which is reciprocated on a suitable track by means of a conventional piston in an air cylinder B. Compressed air is admitted to opposite ends of the cylinder B at predetermined times, in accordance with the usual practice in the glass machinery art.

A pair of guide members 74 having tapered upper faces 75 are positioned adjacent one end of the stroke of arm 73. The guide members are displaceable towards and away from the rollers 67 of the upper halves 60, 61 of the mould so as to engage and elevate said rollers when the mould lies in its normal position, i. e., with the halves 60, 61 uppermost, thereby maintaining the mould halves 60, 61 in their closed state. These guides are retracted substantially in a direction normal to the path of movement of the arm 73 and the parts supported thereby, before the latter commence their movement, or at one end of their stroke. At the opposite end of the stroke of the arm 73 there are a pair of guides 76 (Figs. 12 and 13) having upper tapered edges 77. These guides are likewise displaceable substantially normally across the linear path of travel of the mould, to engage with the rollers 67, elevate the same from the position shown in Figure 12 to that shown in Figure 13 whereby the upper halves 60, 61, which are at that time in the inverted position at the end of the linear path, are angularly displaced about the pivots 63, 64, and are opened.

Figure 10:
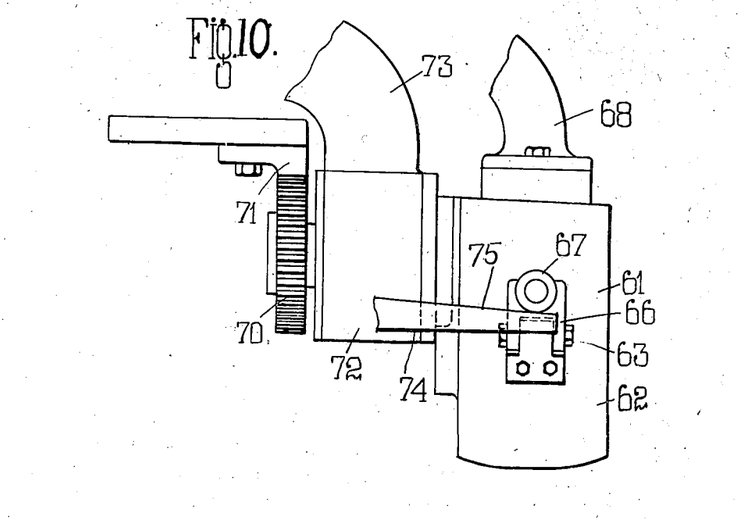
Figure 10 is a corresponding side elevational view.
Figure 11:
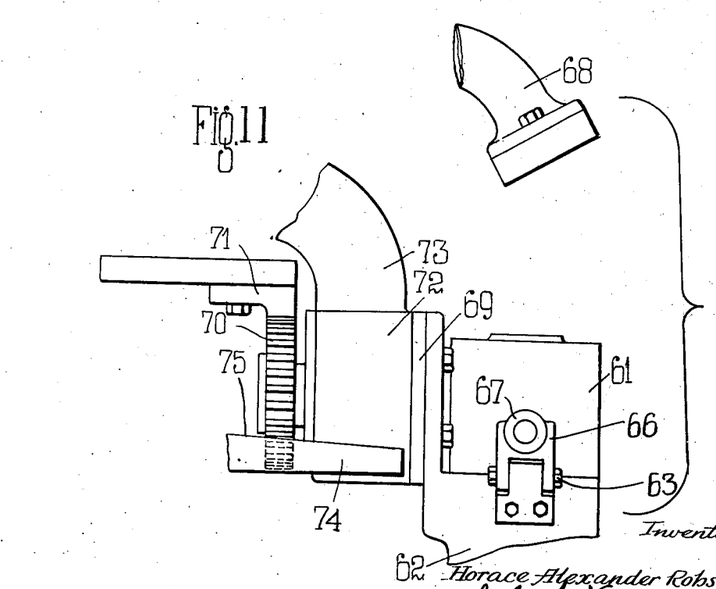
Figure 11 is a side elevational view of the mould in the gathering position but with the suction head removed.

In operation a charge is picked up when the mould parts are in the position shown in Figures 8-10 whereupon the guides 74 are retracted, the suction head 68 is swung upwardly out of contact with the mould and the arm 73 commences its linear displacement. During said displacement the mould is inverted and when it reaches the position shown in Figure 12 the guides 76 are advanced towards the mould to engage with the rollers 67 and what were originally the upper mould halves but are now lowermost, are opened. During opening the charge is temporarily held by the lower portion 62 of the mould which is now uppermost so that by the time the halves 60, 61 are fully opened to allow of descent of the charge, there is no danger of the charge descending other than along the vertical path concentric with the parison mould (not shown) located beneath it.

Any desired means may be employed for reciprocating the guide members 74, 76 into and out of engagement with the rollers 67 at the required periods in the cycle of operations.

Figure 13:
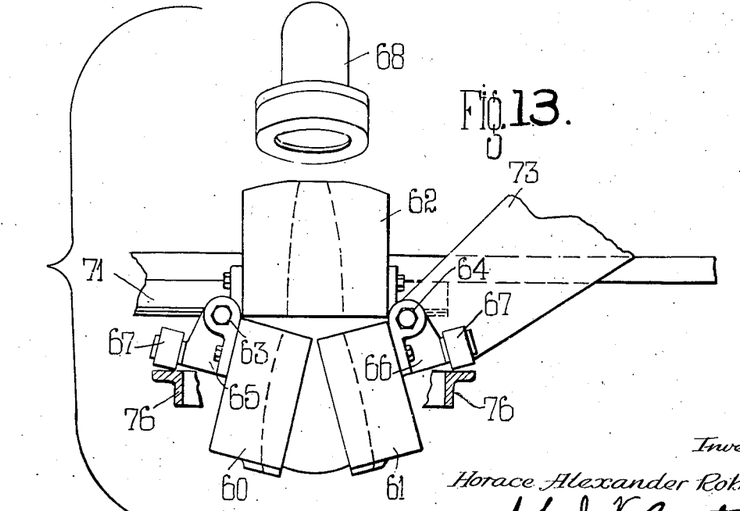
Figure 13 is a front elevational view of the inverted mould corresponding to Figure 12 but with the mould parts open to deliver a charge to a parison mould (not shown) beneath it.
Figure 14:
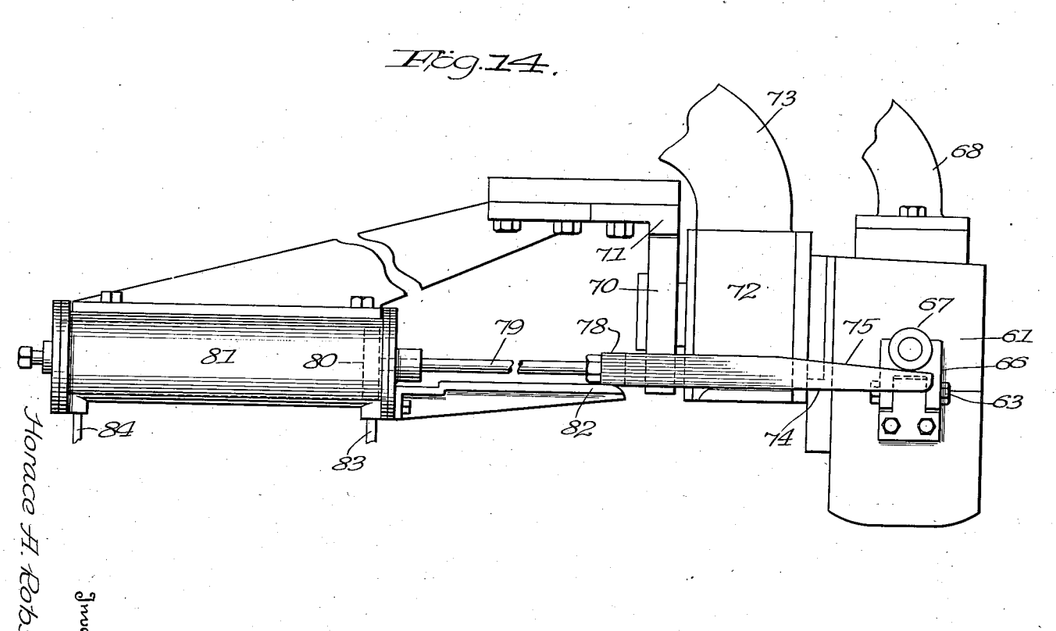
Figure 14 is a side elevation, similar to Figure 10, showing diagrammatically a means for actuating the mould opening or closing fingers.

A suitable mechanism for this purpose is shown in Figure 14, but it must be understood that the invention is not limited to mechanical features of this type. Although the mechanism shown in Figure 14 is arranged to hold the mould parts 60, 61 in their closed position, as shown in Figures 8-10, it will be understood that a similar mechanism will be positioned adjacent the discharge station, to elevate the mould parts, to effect a discharge of glass, as indicated in Figure 13.

The guide fingers 74 may be supported on a crosshead 78, attached to a piston rod 79 carried by a piston 80, slidably mounted within a conventional air cylinder 81. Any appropriate means, such as the supporting platform 82, may be disposed beneath the guide fingers 74 to support them in their operative position. Air under pressure may be admitted to opposite ends of the cylinder 81 through ports 83, 84 in accordance with the usual practice in the glassware machinery art.

Figure 12:
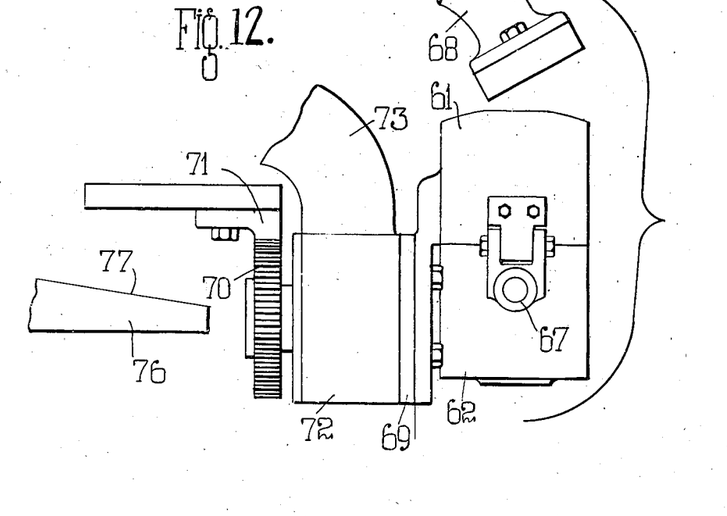
Figure 12 is a corresponding side elevational view of the mould when inverted and in a position in which the mould parts are closed.

As stated above, a similar mechanism may be employed at the discharge position to actuate the guide fingers 76, shown in Figures 12 and 13. It should be noted, however, that these fingers are disposed at a higher level than the fingers 74, because the rollers 67 with which they engage, are at a higher level, after the mould has been inverted. A comparison between Figures 10 and 12 indicates this difference.

I declare that what I claim is:

1. A glass feeding machine comprising an invertible suction gathering mould having a pair of partible mould sections at one end, a support for the mould, movable from a suction gathering position where said partible mould sections are uppermost and the lower end of the mould is immersed in a pool of glass, to a discharge position spaced therefrom, means for applying suction to the upper end of the partible mould sections at the first-mentioned position, thereby to draw a charge of glass into the mould through the lower immersed end thereof, means for displacing the mould support and the mould from the gathering position to the discharge position, means for inverting the mould and the charge of glass therein during said movement, to position the partible mould sections lowermost, and means for opening said partible sections to discharge the glass by gravity therefrom in inverted position.

2. A glass feeding machine comprising an invertible suction gathering mould, a support for the mould, movable from a suction gathering position where the lower end of the mould is immersed in a pool of glass to a discharge position spaced therefrom, means for applying suction to the upper end of the mould at the first-mentioned position whereby to draw a charge of glass into the mould through the lower immersed end thereof, means for displacing the mould between the gathering position and the discharge position, means for inverting the mould and the charge of glass therein during movement of the mould to the discharge position, said means comprising a pinion fixed with respect to the mould and a stationary rack, and means for opening the mould to discharge the charge of glass therefrom in inverted position as compared with its position at the gathering position.

3. A glass feeding machine comprising an invertible suction gathering mould having at least three relatively movable sections, at least two of which at one end of the mould are partible on a plane coinciding with the longitudinal axis of the mould cavity, a support for the mould movable from a suction gathering position where said partible sections are uppermost and where the lower end of the mould is immersed in a pool of glass to a discharge position spaced therefrom, means for applying suction to the upper end of the mould, thereby to draw a charge of glass into the mould through the lower end, means for inverting the mould and the charge of glass therein during movement of the mould to the discharge position, thereby to position the partible sections lowermost, and means for opening said partible sections to discharge the glass by gravity therefrom, in inverted position.

4. A glass feeding machine comprising an invertible suction gathering mould comprising at least three relatively movable sections defining an elongated mould cavity, at least two of said sections being partible on a plane coinciding with the longitudinal axis of said cavity, a movable support for the mould, means for moving the support and the mould from a gathering position where the partible sections are uppermost and where the lower end of the mould is immersed in a pool of glass in a forehearth to a discharge position spaced therefrom, means for applying suction to the upper end of the partible sections of the mould at the gathering position, thereby to draw a charge of glass into the mould through the lower end thereof, means for inverting the mould and the charge of glass therein during movement of the mould to the discharge position, thereby to position partible sections lowermost and the end of the charge which was formerly connected to the glass in the forehearth uppermost, and means for separating said partible sections to discharge the glass from the mould by gravity in said inverted position.

5. A glass feeding machine comprising a substantially horizontal arm mounted for swinging movement about a vertical axis, a suction operated gathering mould carried by said arm for inversion with respect thereto and comprising at least two relatively movable parts, means for swinging said arm and said mould as a unit about said vertical axis, means for inverting said mould as a unit during said swinging movement comprising a stationary rack adjacent the path of swinging movement of the arm and a pinion operatively connected to the mould for inversion therewith and in mesh with said rack, and means for relatively displacing said mould parts for opening said mould when inverted at one end of said swinging movement to discharge the charge of glass therefrom.

6. A glass feeding machine comprising a suction operated gathering mould adapted to pick up a charge of glass and formed of at least two relatively movable parts at the upper end of the mould when in gathering position, means for linearly displacing said mould as a unit from a gathering position to a discharge position, means for inverting said mould as a unit during said linear displacement to transpose the movable mould parts to the lower end of the mould, and means for relatively displacing said mould parts for opening said mould when inverted at one end of said linear displacement to discharge the charge of glass by gravity therefrom.

7. A glass feeding machine comprising a suction operated gathering mould formed of upper and lower parts each comprising a pair of pivoted halves, a movably mounted suction head positioned to be brought into and out of engagement with said pair of upper halves, means for swinging said mould as a unit about a vertical axis, means for inverting said mould as a unit during said swinging movement and means for relatively displacing the halves of said mould parts when said mould is inverted at one end of said swinging movement to open said mould and to permit of deposition of the charge of glass therefrom.

8. A glass feeding machine comprising a suction operated gathering mould mounted for movement between a gathering position adjacent a pool of molten glass to a discharge position spaced therefrom, said mould being formed of upper and lower parts each comprising a pair of pivoted mould halves, a movably mounted suction head positioned adjacent the forehearth and displaceable into and out of engagement with said upper pivoted mould halves, when the mould is in the gathering position, means for swinging said mould as a unit about a vertical axis, means for inverting said mould as a unit during said swinging movement and means operable when said mould is inverted for relatively displacing both pairs of mould halves, the halves of said mould part originally uppermost being displaced by a greater amount than the halves of said mould part originally lowermost to open said mould by a variable extent longitudinally thereof.

9. A glass feeding machine comprising a suction operated gathering mould formed of upper and lower parts each comprising a pair of mould halves mounted for relative displacement about a pivotal axis parallel with the longitudinal axis of the mould, means comprising a suction head movable into engagement with the halves of one part to apply suction to said mould, means for moving said suction head into and out of engagement with said mould, means for swinging said mould as a unit about a vertical axis, means for inverting said mould as a unit during said swinging movement, and means operable when said mould is inverted for opening both pairs of mould halves, said means comprising means for applying a greater degree of pivoting displacement to one pair of mould halves than the other pair to open said mould and discharge the charge of glass therefrom while maintaining a steadying effect on the charge by one of the pair of mould halves during said opening movement.

10. A glass feeding machine comprising a suction operated gathering mould adapted to pick up a charge of glass and formed of three relatively displaceable parts, one of which forms one longitudinal portion of the mould and the other two of which when closed constitute the other longitudinal portion, the last mentioned two parts being pivotally mounted upon the first portion for angular displacement with respect thereto, about parallel axes disposed in a plane normal to the longitudinal axis of the mould, a suction head, means for displacing the suction head into and out of engagement with the mould, means for displacing said mould as a unit from one position to another, means for inverting said mould as a unit during said displacement and means for swinging said pivotal halves of said mould relative to each other and to the other mould portion when said mould is inverted to discharge the charge of glass therefrom.

11. A glass feeding machine comprising a suction operated gathering mould adapted to pick up a charge of glass and formed of three relatively displaceable parts, one of which forms half the mould longitudinally and the other two parts of which, when closed, constitute the other half, the last mentioned two parts being pivotally mounted upon the first part, for pivotal movement with respect thereto about parallel axes disposed in a plane normal to the longitudinal axis of the mould, a suction head, means for displacing the suction head into and out of engagement with the mould, means for displacing said mould as a unit in a linear direction, means for inverting said mould as a unit during said linear displacement and means for relatively swinging said pivotal portions of said mould half upon the other mould half at one end of said linear displacement and when said mould is inverted to discharge the charge of glass therefrom.

12. A glass feeding machine as claimed in claim 2 characterized in that the means for displacing said mould as a unit from one position to another comprises a rotary drum carrying said mould, and in that said pinion for rotating said mould on displacement of said mould as a unit is attached to and carried by said drum.

13. A glass feeding machine as claimed in claim 2 and wherein said means for opening said mould when inverted comprises levers pivoted at one end to said mould parts, a rod to which the other ends of said levers are connected about a common pivot, a stationary cam track and a roller carried by said rod for engagement within said cam track to longitudinally displace said rod and angularly displace said levers.

14. A glass feeding machine as claimed in claim 10 and including cam means, displaceable in a direction normal to that of the displacement of said mould as a unit and rollers carried by said mould parts for engagement by said cam means to cause said mould parts to be pivotally displaced for opening the mould.

HORACE ALEXANDER ROBSON.